UNITED STATES PATENT OFFICE.

CHARLES TOPPAN, OF SALEM, MASSACHUSETTS.

TREATING OILS.

SPECIFICATION forming part of Letters Patent No. 498,588, dated May 30, 1893.

Application filed March 26, 1889. Serial No. 304,880. (No specimens.)

*To all whom it may concern:*

Be it known that I, CHARLES TOPPAN, a citizen of the United States, and a resident of Salem, Essex county, Massachusetts, have invented certain Improvements in Treating Oils, &c., of which the following is a specification.

The object of my invention is to combine with oils, either mineral or vegetable, a certain gas or gases whereby the character of the oil is so modified that its usefulness for various purposes is greatly increased, and in order to attain this object I subject the oils to treatment as hereinafter fully set forth.

In treating the so-called mineral or hydrocarbon oil my object is, first, to remove certain elements, thereby changing the oil from a hydro-carbon or mineral oil to an oil having the characteristics of a vegetable oil; and, second, to reduce the oil to such a condition as to increase its value and adaptability for the various uses in manufactures and in the arts.

In treating purely vegetable oils my object is to purify them and to render them more valuable for various uses.

The oil to be treated is subjected to the action of the gases evolved from an admixture of chloride of sodium, (common salt,) metallic zinc and sulphuric acid.

In practice the oil is placed in a suitable vessel and the gases evolved as aforesaid are introduced into the oil by means of a pipe leading from the vessel in which the gases are generated, and extending nearly to the bottom of the vessel containing the oil, the gases on leaving the pipe, passing through the oil. The kind or form of apparatus for generating the gases or for causing the gases to pass through the oil under treatment constitutes, however, no part of my present invention, and needs no particular description. In practice I have been accustomed to employ for the generation of the gases with which I treat the oils or benzines, a mixture of about three parts, by weight, of chloride of sodium, and one part of zinc, with about six parts of sulphuric acid, preferring commercially pure sulphuric acid.

The treatment of the oils should be carried on at such a temperature that the oil will not chill (preferably not lower than 38° or 39° Fahrenheit) and I have found in practice that the process is expedited by being conducted at a higher temperature, say from 120° to 130° Fahrenheit.

In treating oils, whether mineral or vegetable, the introduction of the gases should be continued until such time as precipitation ceases, as after that no change takes place in the oil, and the gases merely pass through it, and escape without important effect. The oils thus treated retain by absorption a large amount of the gases which are generated in the manner heretofore specified, and this does not escape or become freed from the oils, even although the oil may remain exposed for a long period, in open vessels, to the atmosphere, and as a result the oils that contain the gases have a much higher fire test than any others, so that they are practically non-explosive.

In acting upon oils the gases seem, so far as I can determine, to have the effect of causing a sub-division of the molecules of the oil, which action continues until the process of precipitation ceases, and I find that the specific gravity of the oil is materially increased by the treatment, presumably because of this supposed molecular sub-division.

In treating either mineral or vegetable oils by the introduction of the gases, a tarry matter seems to be developed and precipitated, and by the development and precipitation of this tarry matter I remove from the oil the peculiar color technically known as "bloom" and in the case of mineral or hydro-carbon oil, either crude or distilled, or benzines, I remove their staining or discoloring properties without injuring their capacity to cut gums, cleanse, &c., so as to adapt them for use as solvents in various branches of the arts in which their use has heretofore been considered impossible, or objectionable on account of their staining or discoloring properties as well as their excessive inflammability.

In treating petroleum distillates, commonly known as burning oils, as above set forth, I have produced such changes in them as enable me to use said oils in an ordinary whale oil lamp, without a chimney, and with none, or very little, of the offensive odor which attends the use of the ordinary burning oils made from petroleum under the most favorable conditions.

On account of the raising of the fire test by the treatment above set forth, it becomes possible and safe to use ordinary benzines, or other illuminating or burning oils that have been so treated, for illuminating purposes in ordinary kerosene lamps, but for this purpose it is desirable to still further cleanse or wash the oil, which is done by using a weak solution of carbonate of soda.

In that class of petroleum distillates known as lubricating oils, I have by my treatment materially lessened the tendency to "heat" which they ordinarily possess, and also to loss or danger from the evaporation of the lighter constituents of the oil. I have also made such oils suitable for use as lubricants in cotton or woolen machinery, because if the oil accidentally gets upon the cotton or woolen fibers or fabrics passing through the machinery, as commonly occurs, this oil can be removed without staining such fibers or fabrics.

Chlorine may be used as a bleaching agent for fibers or fabrics with which my lubricating oils have come in contact, without danger of resulting discoloration of the fibers or fabrics.

In subjecting vegetable oils, such as the fixed oil of cotton-seed, linseed, rape-seed, castor-oils, and other vegetable oils to my treatment, I have discovered that the effect is to separate and precipitate from the oil treated, slimy, albuminous and fermentable matter, which produces rancidity in the untreated oils.

Many of the vegetable oils have valuable natural lubricating properties, but their use for that purpose has been heretofore more or limited on account of their rapid oxidation, with consequent gumming, rancidity and the danger of spontaneous combustion. I have found that by my treatment these vegetable oils may be so modified as to very greatly diminish, if not entirely remove these objections, so that I can render such oils fit to be used for a great variety of purposes in the arts, and for illuminating and lubricating purposes for which, heretofore, their use has been impracticable or objectionable.

The rapidity and the continuance of the changes above set forth in the oil or benzine under treatment vary with the kind and original character of said oil or benzine. In my practice I have been accustomed to continue the treatment for a period of from three to ten days or until periodical examination and tests fail to show any further loss of bloom or color, or any further increase in weight as shown by the specific gravity of the oil or benzine, or any further precipitation. After the oil or benzine has been treated in this manner it is drawn off from the vessel containing it, without disturbing the precipitated matter, by means of a siphon or other suitable device.

I claim as my invention—

1. Mineral or vegetable oils combined with the gases evolved from the admixture of chloride of sodium, metallic zinc and sulphuric acid, substantially as specified.

2. The treatment of oils (either mineral or vegetable) and benzines by subjecting them to the action of the gases evolved from the admixture of the chloride of sodium, metallic zinc, and sulphuric acid.

In testimony whereof I have signed my name to this specification in the presence of two subscribing witnesses.

CHARLES TOPPAN.

Witnesses:
FRANCIS M. RICKER,
CHARLES E. BURNS.